Patented June 8, 1954

2,680,278

UNITED STATES PATENT OFFICE 2,680,278

ALUMINA PEBBLE

Sam P. Robinson, Bartlesville, Okla., assignor to Phillips Petroleum Company, a corporation of Delaware No Drawing. Application October 11, 1948,
Serial No. 53,991

8 Claims. (Cl. 25—156)

The invention relates to the manufacture of stabilized alumina pebbles for use in pebble heaters and in other heat exchange applications. A specific aspect of the invention pertains to metal oxide-stabilized alumina pebbles having high resistance to attrition and breakage under severe conditions of cyclic thermal and mechanical shock in moving-bed types of heat transfer apparatus and to a method of manufacturing such pebbles. The invention also relates to the use of metal oxide-stabilized pebbles in heat exchange processes wherein heat is absorbed from a gas in one zone by a gravitating mass of pebbles and delivered to another gas in a second zone with recycling of pebbles and concomitant thermal and mechanical shock to the pebbles.

Pebble heater techniques being developed and applied to various gas heating and reaction processes at the present time make use of a compact stream of small refractory pebbles as a moving heat-exchange medium. These pebbles which are usually ceramic materials, although they may be metallic for some applications, are spheres ranging in size from about 1/8" to 1" in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as the pebbles descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or cool a gas. The pebbles are cooled by contact with a cold gas in one chamber and the cold pebbles are then gravitated through a second chamber in contact with the gas to be cooled. In such processes the pebbles undergo great differences in temperature with the usual mechanical shock and attrition forces involved in gravitating masses of pebbles.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute at maximum temperatures in the neighborhood of 3000° F. In addition to the severe shock resulting from such rapid temperature changes, the pebbles are subjected to considerable mechanical shock and attrition in passing through the apparatus, the former especially, in the elevator equipment and in dropping from the top of the elevator into the top of the pebble heating zone and the latter in passing through the chambers, the throat or throats between chambers and in the pebble flow-regulating feeder. It is found that considerable breakage and attrition of pebbles occurs when using conventional commercial pebbles under such severe conditions of operation.

The pebbles of the invention are utilized to advantage in such processes as those disclosed in my copending applications Serial No. 651,293, filed March 1, 1946, now abandoned, involving the production of $CS_2$, and Serial No. 662,149, filed April 15, 1946, now Patent No. 2,647,041, July 28, 1953, relating to the cracking of hydrocarbons to hydrogen and coke, as well as the process of the copending application of M. O. Kilpatrick, Serial No. 761,696 filed July 17, 1947, now abandoned, relating to the thermal conversion of hydrocarbons to more desirable hydrocarbons. These processes involve temperature changes of the order of 1000 to 2000° F. per minute, with severe mechanical shock and abrasive forces present.

In a pebble heater process requiring the circulation of between 25,000 and 35,000 pounds of pebbles per hour with a maximum temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble.

The invention has several objects, viz.:

To provide a metal oxide-stabilized alumina pebble having high resistance to attrition and breakage under severe conditions of cyclic thermal and mechanical shock in moving-bed types of apparatus;

To provide a method of manufacturing alumina pebbles stabilized against crystal growth when subjected to severe thermal shock and having high resistance to attrition and breakage; and To provide improved heat transfer processes utilizing stabilized alumina pebbles.

Other objects of the invention will become apparent from a consideration of the accompanying disclosure.

The invention is concerned with a method of manufacturing high purity metal oxide-stabilized alumina pebbles which involves incorporating in substantially pure, finely comminuted alumina, certain powdered stabilizing metal oxides which form a solid solution with alumina at elevated temperatures and which also accelerate the growth of alumina crystals, and calcining the mixture to produce stabilized alumina for compacting into pebbles. Such oxides comprise BeO, $Cr_2O_3$, $Fe_2O_3$, $Mn_2O_3$, and $Ti_2O_3$. It is also found that any of the metal compounds readily convertible to these oxides during the initial calcination step may be used with satisfactory results.

The process comprises intimately mixing powdered alumina of at least 150 mesh fineness, and preferably of 325 mesh fineness, and one or more of the stabilizing metal oxides in an amount between 0.1 and 10 weight per cent (preferably 0.5 and 2.5 weight per cent), and calcining the mixture at 2200° to 2500° F. for a period sufficient to at least partially introduce the stabilizing metal oxide into solution in the alumina. A calcination time of from 1 to about 40 hours will effect the formation of enough solid solution to effectively stabilize crystal growth of the alumina. After the calcination step, the finely divided alumina particles containing metal oxide are compacted into ⅛" to 1" balls by suitable compacting procedures and the balls thus formed are calcined at a temperature in the range of 2900° to 3200° F. for a period of at least two hours and until the porosity of the balls, or pebbles, lies in the range of 5 to 20 per cent. Firing until the porosity lies in the range of 7 to 13 per cent results in the formation of a stronger, more rugged pebble and is preferred. If any sintering or agglomeration of the metal oxide impregnated alumina particles results from the first calcination step, the alumina should be again comminuted to the proper fineness by further crushing and grinding and/or screening.

A suitable method of compacting the calcined mixture of alumina and stabilizing metal oxide preparatory to the final calcination, comprises forming an extrudable mixture of the material with between 2 and 10 weight per cent of an organic binder, extruding the mix into rods and cutting the rods into slugs of a length approximating the diameter. The binder must be sufficiently fluid to render the mix soft enough that the extruded slugs are readily compactable into spheres by tumbling in conventional tumbling apparatus. Suitable binders include glue, shellac, dextrin, sugar, casein, lignin, Sterotex, alumina soaps, artificial and synthetic resins, etc. In instances where the binder is not sufficiently fluid, water may be added to the mix to provide the necessary plasticity for extrusion and tumbling.

The alumina for the pebbles may be any relatively pure (at least 99%) alumina which is convertible to alpha corundum during the initial calcining step as well as lightly burned alpha corundum itself. A typical analysis suitable for the process is as follows:

| | Percent |
|---|---|
| $Al_2O_3$ | 99.5 |
| $Na_2O$ | 0.20 |
| $Fe_2O_3$ | 0.25 |
| $SiO_2$ | 0.05 |

However, the alpha corundum may be made from any aluminum oxide material by suitable purification and is preferably precalcined at a temperature in the range of 1800 to 2200° F. for best results. Any of the substantially pure alumina hydrates which are readily convertible to alpha corundum upon heating to the above range may be used as the source of the alumina for the pebble. Purified bauxite and the alumina manufactured by the Bayer process are examples of suitable raw materials for the alumina.

The presence of any substantial amount of silica in the pebble material is to be avoided since it interferes with the formation of solid solution and of rugged heat resistant pebbles. The maximum amount of silica that can be tolerated in the pebble composition is 0.2 weight per cent.

In a preferred modification of the invention, the calcined mixture of alumina and metal oxide, in finely comminuted form, is intimately mixed with from 1 to 20 per cent alumina that has been calcined at a temperature of 1800° to 2200° F., and enough organic binder and water, if necessary, is added to produce an extrudable mix which is then extruded and balled as described hereinbefore.

Another suitable method of compacting the material into balls, or pebbles, comprises starting with a small crystalline nucleus of the material in the range of 10 to 20 mesh and alternately contacting the nucleus with a tacky binder and powdered pebble material with intermediate tumbling or rolling to compact the powdered material into the binder. This amounts to a modified "snow-balling" procedure. This method is applicable to the formation of balls from the calcined alumina-metal oxide mixture alone, or with added calcined alumina free from metal oxide.

Compacting of the alumina-metal oxide slugs into balls or pebbles can be performed in several ways. Rolling of the slugs in a balling machine utilizing three dimensional rotation in a cylindrical drum placed at angles to all three axes of conventional rotary equipment is found to make the most suitable pebbles after firing. The balls are more firmly compacted and more nearly spherical in shape than when made by any other known method. This is probably due to the fact that the slugs are rolled in all directions during the rolling or compacting step. The resulting spherical pebbles with proper moisture content do not stick together and may be stored temporarily or transferred directly to the next step which is the drying operation. Drying to at least 1 wt. per cent and preferably to zero moisture content in low temperature drying equipment is essential to prevent warpage and cracking from fast heating in the calcining operation.

It is important that the compacted balls be fired in the range of 2900° to 3200° F. until the porosity of the balls lies in the range of 5 to 20 per cent, and preferably 7 to 13 per cent, which requires a firing time of at least 2 hours and up to 60 hours in some cases, depending upon the particular composition of the pebbles at the time of firing as well as the manner in which the pebbles have been compacted. If the pebbles are fired to a porosity greater than 20 per cent, they are not strong enough to withstand service in heat transfer processes for any appreciable time, while if they are fired to a porosity below 5 per cent, they are apparently too brittle and lack the resiliency necessary to withstand the severe heat and mechanical shock conditions to which they are subjected.

It is found that the crystal size of alumina calcined in the range of 2900° to 3200° F. lies in the range of 25 to 30 microns and that the size of the crystals is increased from that range to a range of 50 to 200 microns by calcination in the presence of the metal oxides used in the invention. It is believed that the cause of pebble breakage of unstabilized alumina pebbles is due to growth of the crystals during the heating and cooling steps involved in cyclic heat transfer processes. A probable explanation of the success of the process of the invention in producing stabilized alumina pebbles which have exceedingly high resistance to breakage and attrition in moving-bed type heat transfer processes is that the stabilizing metal oxides promote crystal growth to an approximate maximum size before the alumina is formed into pebbles and, therefore, the crystals do not suffer further growth during use in heat transfer processes.

The following examples illustrate the invention, but are not to be construed as unduly or unnecessarily limiting the invention.

*Example I*

1100 lbs. of 325 mesh Bayer process purified alumina is intimately mixed with 15 lbs. of 325 mesh $Mn_2O_3$ and calcined at 2450° F. for 18 hours. The calcined mixture is then crushed and screened through a 200 mesh screen and intimately mixed with 60 lbs. of Sterotex (hydrogenated corn oil). The plastic mass thus formed is extruded in a piston type extrusion press into 3/8" rods which are cut into 3/8" slugs. The slugs are tumbled for 30 minutes in a balling machine utilizing 3 dimensional rotation to produce 3/8" balls which are then fired in a periodic kiln for 12 hours at 3100° F.

The resulting pebbles are smooth and substantially regular $\frac{5}{16}$" spheres having a porosity of about 9% and a crushing strength of at least 1200 lbs.

*Example II*

95% of 325 mesh Bayer process alumina, 3% of $Ti_2O_3$, and 2% of $Fe_2O_3$ (percent by weight) are intimately mixed, calcined at 2500° F. for 8 hours, put through a 200 mesh screen and thoroughly mixed with 8% of 325 mesh Bayer process alumina calcined to 1800° F. 6% of dextrine and enough water is added to form an extrudable mix after thoroughly mixing and the resulting mix is formed into balls as in Example I. The balls are then calcined in a periodic kiln for 8 hours at 3150° F.

The resulting spheres are smooth and regular, have a crushing strength of more than 1500 lbs. and a porosity of about 8%.

Certain modifications of the invention will become apparent to those skilled in the art and the illustrative details disclosed are not to be construed as imposing unnecessary limitations on the invention.

I claim:

1. A process for manufacturing metal oxide-stabilized alumina pebbles having high resistance to attrition and breakage under severe friction and temperature change, which comprises calcining in the range of 2200° to 2500° F. for 1 to 40 hours an intimate mixture consisting essentially of finely comminuted alumina in the amount of 90 to 99.9 weight per cent and at least one member of the group consisting of BeO, $Cr_2O_3$, $Fe_2O_3$, $Mn_2O_3$, $Ti_2O_3$, and compounds converted to the oxides by the calcination in powdered form in an amount between 0.1 and 10 weight per cent, whereby at least a portion of said member enters into the alumina particles in solid solution; compacting the calcined mixture in powdered form into 1/8" to 1" balls with an organic binder; and calcining the balls in the range of 2900° to 3200° F. for at least 2 hours and until their porosity lies in the range of 5 to 20%.

2. The process of claim 1 in which up to 20 weight per cent hydrated alumina calcined in the range of 1800° to 2200° F. is added to the calcined mixture before the compacting step.

3. The process of claim 2 in which the alumina is added in an amount between 2 and 10 weight per cent.

4. The process of claim 1 in which $Ti_2O_3$ is incorporated in the mixture.

5. The process of claim 1 in which $Mn_2O_3$ is incorporated in the mixture.

6. The process of claim 1 in which $Cr_2O_3$ is incorporated in the mixture.

7. A process for manufacturing metal oxide-stabilized alumina pebbles having high resistance to attrition and breakage under severe friction and temperature change, which comprises calcining in the range of 2200° to 2500° F. for 1 to 40 hours an intimate mixture of finely comminuted alumina and at least one member of the group consisting of BeO, $Cr_2O_3$, $Fe_2O_3$, $Mn_2O_3$, $Ti_2O_3$, and compounds converted to the oxides by the calcination, the weight of the selected member being in the range of 0.5 to 2.5 per cent of the alumina; screening the calcined mixture through a 200 mesh screen; forming an extrudable homogeneous mix comprising said mixture and an organic binder; extruding said mix into 1/8" to 1" rods and cutting the rods into slugs individually compactable into 1/8" to 1" balls; compacting said slugs into balls; and calcining said balls at 2900° to 3200° F. for at least 2 hours and until their porosity lies in the range of 7 to 13%.

8. A process for manufacturing metal oxide-stabilized alumina pebbles having high resistance to attrition and breakage under severe friction and temperature change, which comprises calcining in the range of 2200° to 2500° F. for 1 to 40 hours an intimate mixture of finely comminuted alumina and at least one member of the group consisting of BeO, $Cr_2O_3$, $Fe_2O_3$, $Mn_2O_3$, $Ti_2O_3$, and compounds converted to the oxides by the calcination, the weight of the selected member being in the range of 0.5 to 2.5 per cent of the alumina; screening the calcined mixture through a 200 mesh screen; intimately mixing the screened material with from 2 to 10 weight per cent hydrated alumina calcined within the range of 1800° to 2200° F.; compacting the resulting mixture with from 2 to 10 weight per cent of an organic binder into ⅛" to 1" balls; and calcining the balls at 2900° to 3200° F. for at least 2 hours and until their porosity lies in the range of 7 to 13%.

References Cited in the file of this patent

UNITED STATES PATENTS

| Number | Name | Date |
|---|---|---|
| 988,230 | Verneuil | Mar. 28, 1911 |
| 1,430,724 | d'Adrian | Oct. 3, 1922 |
| 1,877,531 | Reichmann | Sept. 13, 1932 |
| 2,023,426 | Lasley | Dec. 10, 1935 |
| 2,095,982 | Heany | Oct. 19, 1937 |
| 2,139,026 | Matheson | Dec. 6, 1938 |
| 2,369,709 | Baumann et al. | Feb. 20, 1945 |
| 2,389,636 | Ramseyer | Nov. 27, 1945 |
| 2,448,257 | Evans | Aug. 31, 1948 |
| 2,482,580 | Feichter | Sept. 20, 1949 |
| 2,532,606 | Church | Dec. 5, 1950 |
| 2,532,613 | Dutcher | Dec. 5, 1950 |